United States Patent [19]
Lesser

[11] 3,844,836
[45] Oct. 29, 1974

[54] METHOD FOR WASHING VEHICLES WITH OSCILLATING, FLEXIBLE STRIPS

[76] Inventor: Jerome M. Lesser, 713 Parkway, Fultondale, Ala. 35068

[22] Filed: Aug. 2, 1973

[21] Appl. No.: 385,040

Related U.S. Application Data

[62] Division of Ser. No. 139,151, April 30, 1971, Pat. No. 3,765,043.

[52] U.S. Cl. .................................. 134/6, 134/32
[51] Int. Cl. ............................................ B08b 1/02
[58] Field of Search ............ 15/97 R, DIG. 2; 134/6, 134/32, 123

[56] References Cited
UNITED STATES PATENTS

| | | | |
|---|---|---|---|
| 3,487,490 | 1/1970 | Wuster | 15/DIG. 2 |
| 3,499,180 | 3/1970 | Hurwitz | 15/97 R |
| 3,504,394 | 4/1970 | Weigele et al. | 15/97 R X |
| 3,510,898 | 5/1970 | Tatara et al. | 15/DIG. 2 |

Primary Examiner—S. Leon Bashore
Assistant Examiner—Richard V. Fisher
Attorney, Agent, or Firm—Pennie & Edmonds

[57] ABSTRACT

Strips of flexible material are oscillated back and forth along the longitudinal dimension of a vehicle as it passes through an automatic car wash with the oscillations having an up and down component to produce a vigorous snagging action of the strips. This combined up and down and back and forth motion is achieved by securing a plurality of the flexible strips to each of a number of parallel aligned, flexible supports, such as, for example, rope. The longitudinally disposed strips insure a thorough scrubbing of the vehicle being washed for a substantial portion of the time the vehicle is within the car wash.

2 Claims, 9 Drawing Figures

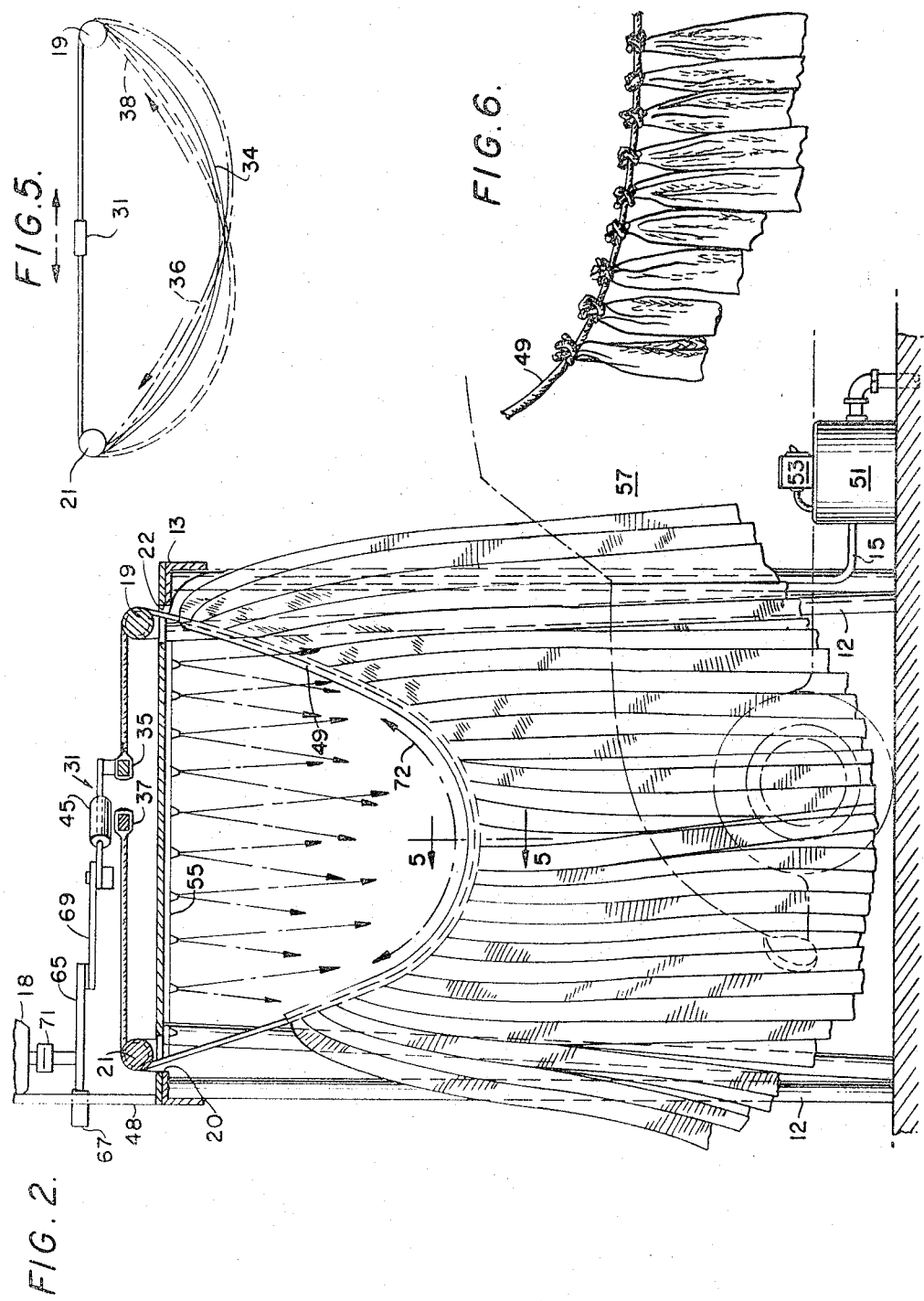

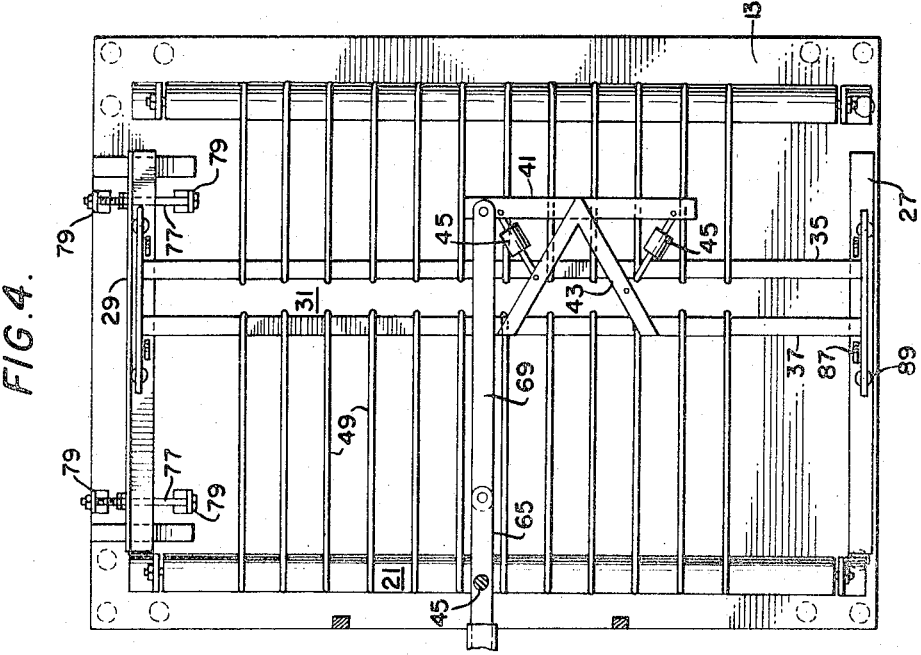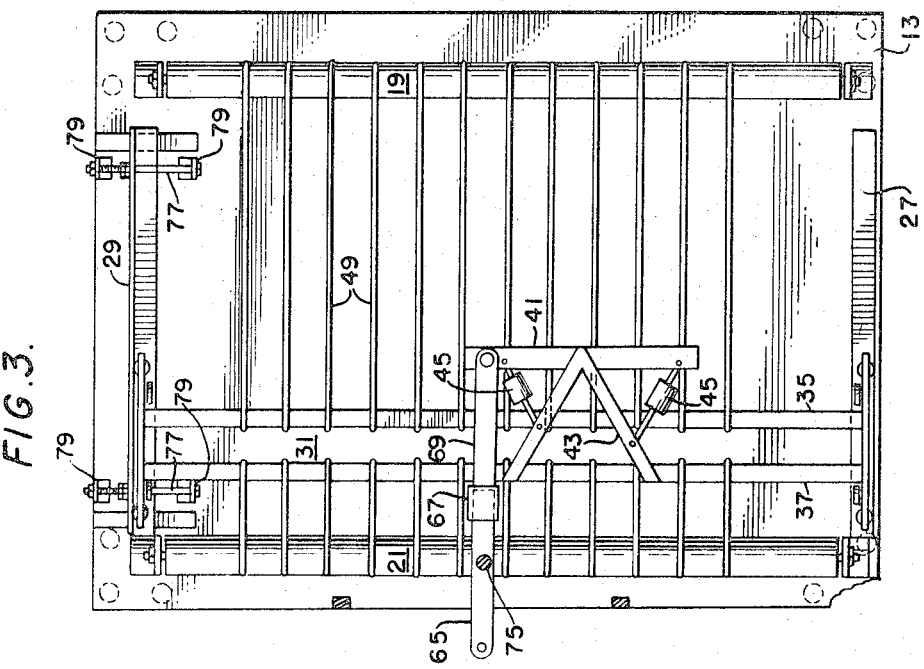

METHOD FOR WASHING VEHICLES WITH OSCILLATING, FLEXIBLE STRIPS

This is a division, of application Ser. No. 139,151, filed Apr. 30, 1971, now U.S. Pat. No. 3,765,043.

BACKGROUND OF THE INVENTION

This invention relates to an automatic car wash and more specifically to an automatic car wash for thoroughly scrubbing a vehicle with a plurality of flexible strips of water absorbent material by oscillating the strips back and forth with an up and down motion along the direction of movement of the vehicle through the car wash.

There are many different types of car washing devices being utilized today with each having been proved less than adequate in one or more respects. Thus, many car washing devices do not have the flexibility for adequately washing vehicles other than standard passenger cars. Other car washing devices have a tendency to damage the vehicles they wash such as by ripping antennas from the body of the car, scratching or otherwise scarring the car's finish and damaging luggage racks and lights positioned on the top of the cars. Past car washing devices were also plagued with numerous problems occurring from inefficient washing because these devices did not adequately cover the manifold contours on the surfaces of present day cars and did not adequately agitate the dirt and grime on the surface of the cars. Typical of surface areas of vehicles not adequately cleaned by present car washing devices are the rear windows, the areas around the windshield wipers, the extremes of the side windows, the front and rear bumpers, and the front and rear portions of compact and imported cars.

Two principal types of devices have been developed for washing cars. The first type has a rotary brush positioned over the vehicle being washed and which is biased against the vehicle as it passes through the car wash. These rotary brushes have not been particularly successful in reaching the hood and top of vehicles and have not adequately scrubbed contoured areas of cars such as around vehicle fenders and bumpers. Further, such brushes tend to scratch the painted surface and break off antennas. In addition, if a large vehicle, such as a truck, is being washed, the brushes are not capable of washing the sides of the truck that are not cleaned by the side brushes and, accordingly, these devices are limited to washing standard size cars unless additional washing equipment is utilized.

The second type of car wash utilizes a curtain comprised of bands of flexible material which oscillate back and forth in a path transverse to the direction of movement of the vehicle as it passes through the car wash. These car washers may be characterized as not providing sufficient surface agitation since the amplitude of the curtain oscillation is typically small and, further, the back and forth motion of the bands does not adequately cover the numerous contours on the surfaces of cars.

It, therefore, is an important object of this invention to provide an automatic car wash that uniformly and efficiently scrubs a vehicle being washed.

It is another object of this invention to provide a car wash that thoroughly scrubs the surface of a vehicle being washed without damaging the vehicle.

It is yet another object of this invention to provide a car wash capable of washing the many different types of present day vehicles.

It is yet another object of this invention to provide a car washing mechanism capable of installation in present day car washing facilities.

SHORT STATEMENT OF THE INVENTION

Accordingly, this invention relates to an automatic car wash having a plurality of flexible strips of scrubbing material suspended from a frame in rows aligned substantially parallel to the direction of movement of a vehicle through the frame. The flexible strips are oscillated along the direction of movement of the vehicle passing through the frame with an up and down as well as back and forth motion. This motion is achieved by securing a plurality of the flexible strips to each of a number of parallel aligned flexible supports which are connected at each end to a reciprocating drive arm. The reciprocating drive arm pulls the flexible strip supports over idler rollers positioned at each end of the frame as it moves back and forth, thus causing the flexible strip material to oscillate back and forth and additionally to oscillate up and down as the flexible supports are pulled upward over the idler bars. The longitudinally disposed strips insure a thorough scrubbing of the vehicle being washed for a substantial portion of the time it is within the car wash frame.

BRIEF DESCRIPTION OF THE DRAWINGS

These and other objects of the invention will become more fully apparent from the following detailed description, appended claims, and the accompanying drawings in which:

FIG. 2 shows a section view of the car wash of the invention taken along the lines 2—2 of FIG. 1.

FIG. 3 is a plan view of the drive means of the automatic car wash with the drive linkage in a first position.

FIG. 4 is a plan view of the drive means of this invention with the linkage portion thereof in a second position.

FIG. 5 is a section view showing how the strips of scrubbing material are secured to the flexible support means, and it is taken along the lines 5—5 of FIG. 2.

FIG. 6 shows a diagram of the extreme positions taken by the flexible strip support as it is pulled over the idler rollers of the car wash.

BRIEF DESCRIPTION OF THE PREFERRED EMBODIMENT

Figure 1:
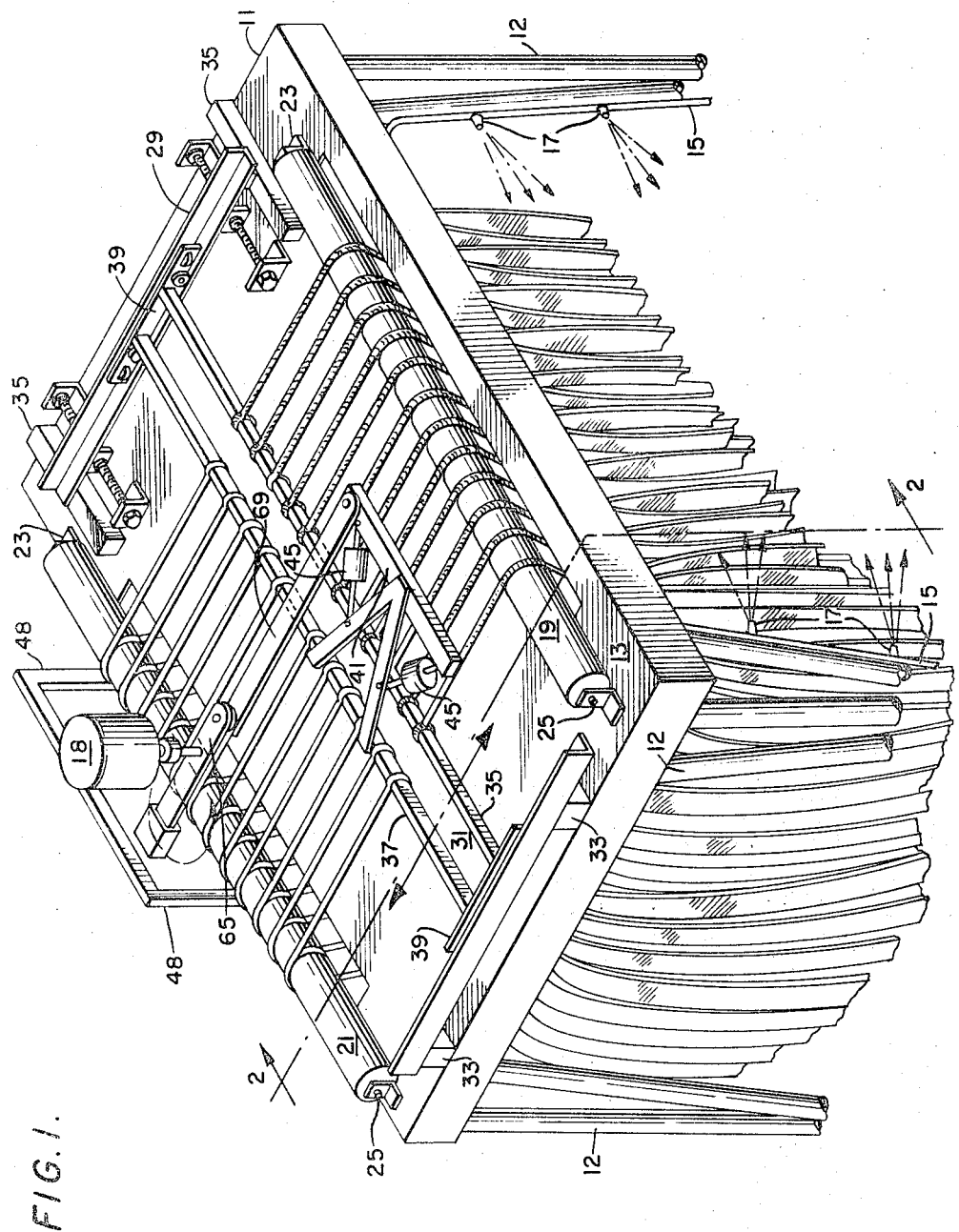
FIG. 1 is a perspective view of the car wash of this invention.

Referring to FIG. 1, there is shown a car wash frame 11 which includes a triangularly disposed group of poles 12 supporting each corner of a rectangular overhead platform 13. Each of the poles are rigidly secured at their upper ends to the platform by any suitable technique such as by welding and are joined at their lower ends to form a node which is secured to the floor of the car wash facility. A tubing 15 for conveying a soapy water solution is mounted to the interior poles at the end of the frame where the vehicle being washed enters the car wash mechanism with the tubing extending across the frame under the platform 13. The tubing has a plurality of nozzles 17 connected thereto. In the preferred embodiment there are 3 nozzles mounted to each side of the frame with a suitable number (not shown) mounted to the underside of platform 13 with each of the nozzles directing a forced stream of a soapy solution of water against the vehicle being washed. The platform 13 is generally rectangular in shape and has two parallel aligned slots at each end of the platform where the vehicle being washed ingresses and egresses from the automatic car wash. These slots are aligned in a direction transverse to the direction of movement of the vehicle through the car wash. It should be understood that the platform 13 need not be a solid material such as shown in the figure but rather could consist of a structural framework for supporting each of the component elements of the car wash.

A pair of idler rollers 19 and 21 are mounted over the aforementioned slots by means of a pair of pillow block bearings 23 adapted to receive the axle portion 25 of the idler rollers. A pair of guides 27 and 29 are mounted on each side of the platform 13 for supporting a reciprocating drive arm 31. Guide 27, which may be of any suitable construction but which in the preferred embodiment is an angle iron, is rigidly mounted to platform 13 and spaced therefrom by means of spacers 33. Guide 29 is movably mounted on platform 13 by means of a pair of threaded rods which are fixedly mounted on platform 13. Blocks 35 are secured to platform 13 and provide a platform upon which the slidable undersurface of guide 29 is supported. The drive arm 31 includes two parallel aligned rods 35 and 37 which are secured to a pair of rails 39 at each end of the drive arm. A shock arm 41 is rotatably connected to a V-shaped tongue 43 which is rigidly connected to the tubes 35 and 37 of the cross arm 31. The ends of the shock arm 41 are connected to tube 37 by way of a pair of dash pots or dampers 45. A motor 18 is mounted over the top of platform 13 by means of a pair of legs 48 secured to the platform. The motor rotates the balance arm 65 of a linkage ararngement such that the translation arm 69 thereof reciprocates arm 41 back and forth along the direction of movement of the vehicle through the car wash.

As the balance arm rotates, the shock arm 41 and drive arm 31 reciprocate back and forth across the top of the platform. The dampers are required because of the large forces generated when the direction of motion of the drive arm is reversed. These tend to reduce shock and hence substantially improve the lifetime of the car wash. The stroke of the reciprocating drive arm 31 may be altered by varying the effective length of the balance arm 65 of the linkage arrangement.

A plurality of ropes 49 are mounted to tube 35 at one end and to tube 37 at the other end by any suitable means. These ropes pass over each of the idler rollers and into the area through which the car being washed passes. Flexible strips of material, such as strips of rug, are secured to the ropes as will be described more fully hereinbelow. As drive arm 31 reciprocates in the direction shown by the arrow, the strips of flexible material will oscillate back and forth in the direction of movement of the vehicle being washed with an up and down motion thereby scrubbing the entire external portion of the vehicle.

Refer now to FIG. 2 which is a cross sectional view of the car wash of FIG. 1 taken along the lines 2—2 thereof. As shown, tubular poles or legs 12 support platform 13 at the corners of the platform. The legs join in a node at the floor of the car wash and diverge slightly at the top of the car wash where the legs meet the platform. A water pump 51 into which is metered a selected amount of soap from soap container 53 forces water through tube 15 upward toward the top of the platform, across the underside of the platform, and then down the opposite side of the car wash. A series of tubes 55 are connected to tube 15 and extend along the underside of the platform parallel to the direction of the movement of vehicle 57 through the car wash. Each of the tubes 55 and 15 have a number of nozzles connected thereto which are aligned such that water being sprayed therefrom is directed toward the vehicle being washed. It should be understood that the number and arrangement of the nozzles is not important provided that the vehicle being washed is initially thoroughly wetted as it passes into the automatic car wash and that a sufficient amount of the cleaning solution is provided to the flexible strips of scrubbing material.

A flexible non-water absorbing material, such as a nylon rope, is shown attached at one end to tube 37 of drive arm 31 by any suitable means and is passed over idler roller 21 through the slot 20 and into the area through which a vehicle being washed passes. The rope is passed upward through the other slot 22, over idler roller 19 and is secured to tube 35 of drive arm 31. Flexible strips of water absorbent material such as, for example, strips of an indoor-outdoor rug, are attached to the rope in any suitable manner. The strips of rug are spaced with respect to each other by a suitable distance to permit freedom of movement of the strips and to prevent damage to fragile portions of the cars being washed. Refer now to FIG. 5 which shows an example of a suitable means for securing the flexible strips of rug to the rope 49. The strips of rug are secured to the rope by means of a slip knot formed in the rope which tightly fixes the position of the strip of rug with respect to the rope. The knot is formed by looping the rope and then pulling a portion of the rope through the loop to form a second loop. The strip of rug is pulled through the second loop until the longitudinal center thereof is positioned proximate the loop. The portions of the rope proximate the knot are then pulled causing the loops to tighten about the strip of rug. As a force is applied pulling the rug away from the knot, the knot tightens preventing any slippage of the rug with respect to the knot or the knot with respect to the rope. By this unique but simple technique, the rug strips are prevented from sliding on the rope and a durable but inexpensive means of fastening the strip in place is provided.

Refer now back to FIG. 2. Any suitable number of flexible strips may be secured to the rope, however, it must be kept in mind that too many strips may damage portions of the vehicle being washed, such as the antenna, due to the weight of the strips which, of course, are saturated with water for most of the cleaning cycle.

A motor 18 fixedly attached to table, not shown, which is supported by legs 48 provides power to oscillate the flexible strip of material. The motor may be of any suitable type but in the preferred embodiment is a 1 ½ horse power, 230–460 volt, three phase, 30 RPM gear head motor. The motor shaft is coupled to balance arm 65 by means of a suitable coupling device 71 which in the preferred embodiment is a Dodge Paraflex coupling. Balance arm 65 is weighted by a weight 67 at one end and is rotatably connected to a translation or link arm 69 at the other end. Weight 67 balances the force exerted on balance arm 65 to reduce wear on the coupler 71. The shaft of motor 18 rotates at a rate of 30 RPM and consequently, balance arm 67 rotates at the same speed. Thus, link arm 69 is pulled and pushed by arm 65 once each one-thirtieth of a minute. Link arm 69 is rotatably connected to coupler arm 41 and, coupler arm 41 is rotatably attached to tongue 43 which in turn is rigidly secured to tubes 35 and 37 of drive arm 31. A damper or dash pot 45 is shown which smoothes the sharp forces conveyed to coupler arm 41 as oscillating arm 65 rapidly rotates about the shaft of motor 18.

In operation as motor 18 rotates balance arm 65, the drive arm 31 is reciprocated back and forth in the direction shown by the arrows. The length of the stroke of the drive arm may typically be 36 inches but can be adjusted by adjusting the length of oscillating arm 65 and link arm 69 to any suitable stroke length. The reciprocating motion of drive arm 31 pulls the rope 49 back and forth causing the flexible strip of material, i.e., flexible strips of rug, back and forth with an up and down motion parallel to the direction of movement of the vehicle 57 through the car wash. This back and forth motion having an up and down component is illustrated by the arrow 72 shown in the figure. This combined motion insures that each portion of external periphery of the vehicle is scrubbed as the vehicle passes through the car wash.

FIG. 6 shows the extreme positions of the rope as it is oscillated by drive arm 31. The rope is shown in a rest position, as designated by the numeral 34, wherein the center of the rope is the closest portion thereof to the floor. Numeral 36 shows the rope after it has been pulled to the left by the rightward movement of the drive arm 31. The left portion of the rope is taut and has moved upward toward the platform whereas the right portion of the rope has dropped away from the platform and is relatively loose. When the rope is pulled to the right as shown by numeral 38, the previously taut portion of the rope drops away from the platform whereas the previously loose portion becomes taut and is pulled upward toward the platform. This up and down motion prevents entanglement of the strips and lifts them over fragile antennas and luggage racks and into normally inaccessable portions of the car such as around the bumpers and the area around the windshield wipers. Such a motion prevents damage to fragile external portions of the car should the rug material get caught since the rugs are twice each cycle lifted up and away from the car. Finally, this motion improves the agitation of the rug strips against the vehicle body since there is a component of motion in addition to the back and forth motion. It should be understood that the back and forth motion of the strips along a direction parallel to the movement of the vehicle insures that the steep rear portions of cars such as stationwagons and foreign compact cars are adequately scrubbed.

Refer now to FIGS. 3 and 4 which show the linkage arrangement for converting the rotary motion of the motor shaft to the translational motion of the drive arm 31. In FIG. 3, the linkage consisting of balance arm 65 and link arm 69 is fully contracted. Shown in cross section is shaft 75 of the coupler from the motor shaft about which arm 65 rotates. Weight 67 is shown at one end of arm 65 with the other end thereof rotatably connected to link arm 69. Link arm 69 is connected to coupler 41 and forces coupler arm 41 back and forth as arm 65 rotates. Dash pots 45 are shown secured to tongue 43 at one end and coupler arm 41 at the other end. The dash pots absorb the shock imparted to the coupler when the direction of travel of the drive arm 31 changes. Coupler arm 41 is shown rotatably connected to tongue 43 which is rigidly secured to tubes 35 and 37 of drive arm 31.

FIG. 4 shows the linkage arrangement when in a fully extended position. Thus, oscillating arm 65 has rotated 180° about shaft 75 thereby pushing link arm 69 to the right. In turn, coupling arm 41 and, therefore drive arm 31 are pushed to the right to the maximum extent possible with the illustrated dimensions of the oscillating and link arms.

Guides 27 and 29 are shown positioned at opposite ends of the platform 13. As shown, guide 29 may be moved inwardly or outwardly with respect to the platform 13 to accommodate different size car wash facilities. A pair of threaded rods 77 are each secured to a pair of angle irons 79 which are rigidly attached to the top of platform 13. Guide 29 is then slidably attached to rods 77 by means of a pair of angle irons secured rigidly to guide 29 and positioned by means of a pair of nuts on the threaded rods 77. Thus, by moving the nuts on each side of the angle irons which support the guide, the guide 29 is shifted with respect to the platform. Also, shown are a pair of rails which are fixedly attached to the respective ends of the drive arm 31. Each rail has a pair of rollers 89 rotatably attached thereto for rotation about a vertical axis and a second pair of rollers 87 attached thereto for rotation about a horizontal axis. These rollers provide a bearing means for permitting drive arm 31 to reciprocate back and forth with a minimum of friction. Rollers 89 having vertically disposed rotational axes, constrain the drive arm 31 from moving in a direction transverse to that of the movement of a vehicle while bearings 87 vertically support the drive arm 31.

Figure 7:
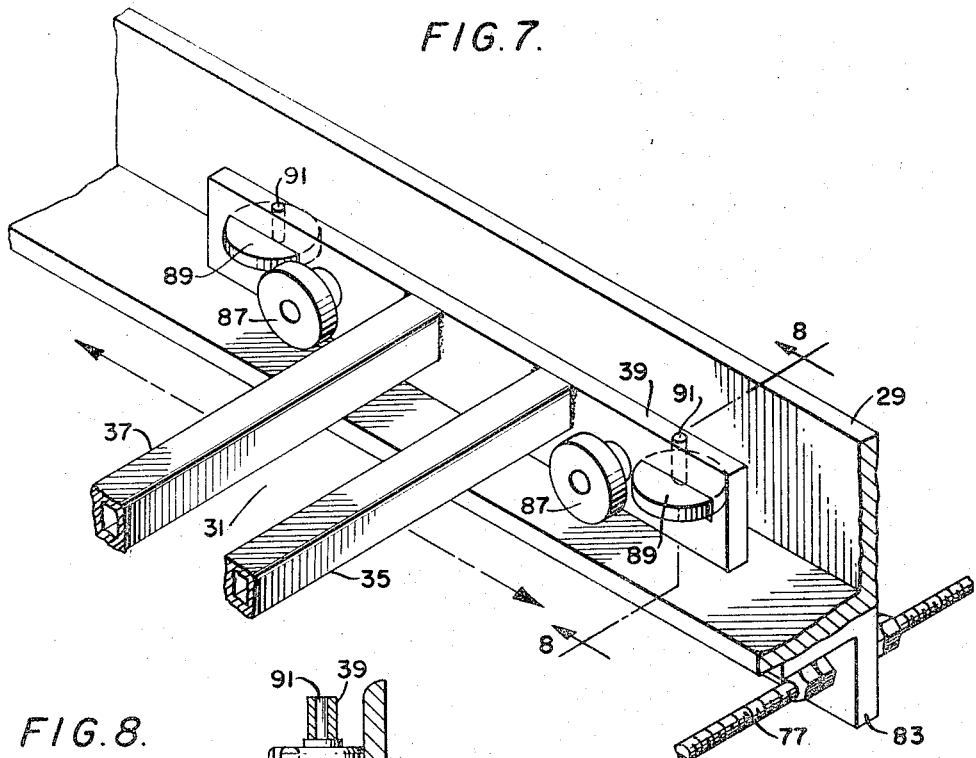
FIG. 7 is a cutaway view of the reciprocating drive arm of the automatic car washer of this invention mounted on the frame.

Refer now to FIG. 7 which shows a detailed cutaway view of a portion of the rail and guide arrangement. As shown, guide 29 is slidably secured to threaded rod 77 by means of angle iron 83. The threaded rod extends through a hole in the angle iron with the angle iron being secured with respect to the rod by means of at least two nuts one threaded on each side of the angle iron. The guide 29 may be moved with respect to rod 77 by changing the position of the nuts.

The drive arm consisting of tubes 35 and 37 is rigidly attached to rail 39 by any suitable technique such as a weld. Rotatably mounted to the rail 39 are a pair of rollers 87 which rotate about a horizontal axis and which provide a relatively frictionless movement of the rail 39 on the guide 29. Also shown are a second pair of rollers 89 which are each mounted through a slot in the rail 39 such that they rotate about a vertical axis. Rollers 89 prevent lateral movement of the drive arm 31 as the drive arm reciprocates in the direction indicated by the arrow.

Figure 8:
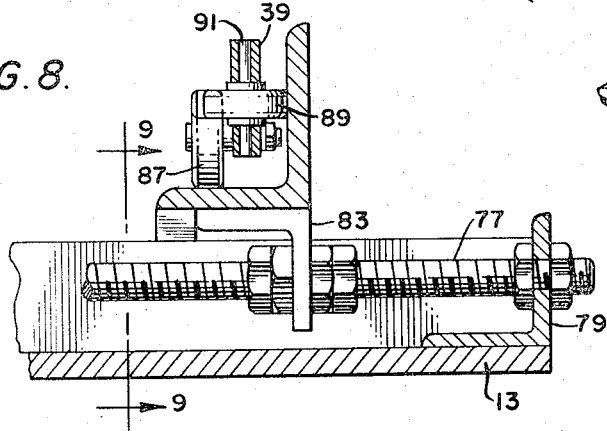
FIG. 8 is a cutaway view taken along the line 8—8 of FIG. 7 and shows adjustable means for supporting the reciprocating drive arm.

Refer now to FIG. 8 which shows a sectional view taken along the lines 8—8 of FIG. 7. Rail 39 is shown having a roller 89 rotatably connected thereto with the axle 91 of the roller extending vertically through a hole in the rail. Nylon bushing 93 may be utilized to decrease the frictional contact between the sides of the roller and the rail. Roller 87 is shown secured to the rail 39 with the axle thereof extending through a hole in the rail and secured thereto by means of a nut threaded on a threadable portion of the axle. Threaded rod 77 is secured at one end to the platform by means of an angle iron 79 and at the other end by a second angle iron, not shown. The threaded rod is secured to the angle iron 79 by means of a pair of nuts, one threaded on each side of the angle iron as shown. The guide 39 is slidably attached to threaded rod 77 by means of an angle iron 83. Angle iron 83 has a hole through which rod 77 passes and is secured in place by means of at least two nuts, one situated to each side of the angle iron and positioned snugly thereagainst.

Figure 9:
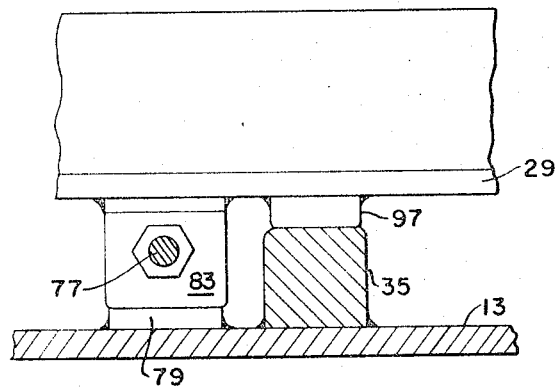
FIG. 9 is a section view taken along the line 9—9 of FIG. 8 and shows the support upon which the drive arm rests.

Referring to FIG. 9, there is shown a cross sectional view of the guide taken along the line 9—9 of FIG. 8. A metal tube 97 is attached to the underside of angle iron 29 and is in contact with a metal tube 35 which is secured to the top of tube 13. The tube 97 abuts against the tube 35 to support the weight of the guides 27 and 29 which in turn support the drive arm 39. Thus, this arrangement prevents large coupling forces from breaking rod 77.

The unique back and forth and up and down motion of the strips as they are oscillated produces at the end of each stroke in a given direction a vigorous snapping action, akin to the snapping of a towel, resulting in a further vigorous washing action which acts to remove even the most tenaciously adherent dirt, grime, and the like materials from the vehicle being washed. Such snapping washing action occurs before the vehicle is within and even after the vehicle leaves the frame 11.

While the preferred embodiment of this invention has been described in such detail as to enable one of ordinary skill to practice the invention, it should be understood that there may be other embodiments that fall within the scope of the invention as defined by the following claims.

I claim:

1. A method of washing a vehicle comprising the steps of:

applying a aqueous cleaning solution to the vehicle, passing a plurality of flexible water absorbent strips over said vehicle with a back and forth motion along the longitudinal dimension of said vehicle, and oscillating said flexible strips up and down as said strips pass back and forth over said car, a portion of said flexible strips being raised while another portion is being lowered during said oscillation and all said strips describing like paths of motion such that at the end of each stroke of the oscillation a vigorous snapping action of the strips is produced to coact with the cleaning solution and thereby wash the vehicle.

2. The method of claim 1 further comprising the step of oscillating said flexible strips up and down once each time said strips pass back and forth over said vehicle.

* * * * *